US009333803B2

(12) United States Patent
Izuchi

(10) Patent No.: US 9,333,803 B2
(45) Date of Patent: May 10, 2016

(54) PROCESS FOR PRODUCING RESIN-EXTENDED ISOPRENE RUBBER, RUBBER COMPOSITION OBTAINED BY THE PROCESS AND PNEUMATIC TIRE

(75) Inventor: Masaaki Izuchi, Kodaira (JP)

(73) Assignee: BRIDGESTONE CORPORATION, Tokyo (JP)

( * ) Notice: Subject to any disclaimer, the term of this patent is extended or adjusted under 35 U.S.C. 154(b) by 1021 days.

(21) Appl. No.: 13/265,489

(22) PCT Filed: Apr. 21, 2010

(86) PCT No.: PCT/JP2010/057031
§ 371 (c)(1),
(2), (4) Date: Oct. 20, 2011

(87) PCT Pub. No.: WO2010/123015
PCT Pub. Date: Oct. 28, 2010

(65) Prior Publication Data
US 2012/0031537 A1    Feb. 9, 2012

(30) Foreign Application Priority Data

Apr. 21, 2009  (JP) .................... 2009-103146
Apr. 21, 2009  (JP) .................... 2009-103150

(51) Int. Cl.
| | | |
|---|---|---|
| *C08J 3/05* | (2006.01) | |
| *B60C 1/00* | (2006.01) | |
| *C08L 7/00* | (2006.01) | |
| *C08L 21/00* | (2006.01) | |
| *C08J 3/00* | (2006.01) | |
| *C08K 3/00* | (2006.01) | |
| *C08L 23/20* | (2006.01) | |
| *C08L 23/24* | (2006.01) | |

(52) U.S. Cl.
CPC .............. *B60C 1/0016* (2013.04); *C08J 3/005* (2013.01); *C08J 3/05* (2013.01); *C08L 7/00* (2013.01); *C08L 21/00* (2013.01); *C08J 2307/02* (2013.01); *C08J 2309/10* (2013.01); *C08K 3/0033* (2013.01); *C08L 23/20* (2013.01); *C08L 23/24* (2013.01); *Y10T 152/10765* (2015.01)

(58) Field of Classification Search
CPC ....................................................... C08J 3/05
See application file for complete search history.

(56) References Cited

U.S. PATENT DOCUMENTS

| | | | |
|---|---|---|---|
| 4,029,633 A | | 6/1977 | Hagopian et al. |
| 4,578,411 A | * | 3/1986 | Budd et al. .................... 524/156 |
| 4,798,854 A | | 1/1989 | Visca et al. |
| 5,115,026 A | | 5/1992 | Visca et al. |
| 6,037,418 A | | 3/2000 | Mukai et al. |
| 6,057,394 A | * | 5/2000 | Bodiger et al. ............... 524/423 |
| 2003/0088006 A1 | 5/2003 | Yanagisawa et al. |
| 2004/0053023 A1 | 3/2004 | Galle et al. |
| 2007/0123636 A1 | 5/2007 | Hattori et al. |
| 2007/0173567 A1 | 7/2007 | Ishino |
| 2008/0125534 A1 | 5/2008 | Kondou |
| 2010/0113703 A1 | 5/2010 | Houjo et al. |
| 2012/0031537 A1 | 2/2012 | Izuchi |
| 2012/0305159 A1 | 12/2012 | Sakamoto et al. |

FOREIGN PATENT DOCUMENTS

| | | |
|---|---|---|
| GB | 624079 | 5/1949 |
| JP | 62-011731 A | 1/1987 |
| JP | 4-089847 A | 3/1992 |
| JP | 5-163359 A | 6/1993 |
| JP | 08-208888 | 8/1996 |
| JP | 10-128741 A | 5/1998 |
| JP | 10-265616 A | 10/1998 |
| JP | 2003-041057 A | 2/2003 |
| JP | 2004-099625 A | 4/2004 |
| JP | 2006-063093 A | 3/2006 |
| JP | 2007-177209 A | 7/2007 |
| JP | 2007-217543 A | 8/2007 |
| JP | 2007-291333 A | 11/2007 |
| JP | 2008-174664 A | 7/2008 |
| JP | 2008-189725 | 8/2008 |

(Continued)

OTHER PUBLICATIONS

"Processing Styrene Polymers and Copolymers by Injection Molding" BASF 2001, see http://www2.basf.us//PLASTICSWEB/displayanyfile?id=0901a5e180005b3e.*

(Continued)

*Primary Examiner* — Peter D Mulcahy
(74) *Attorney, Agent, or Firm* — Sughrue Mion, PLLC

(57) ABSTRACT

The present invention relates to a process for producing a resin-extended isoprene rubber comprising (A) a rubber component containing a natural rubber and/or a synthetic isoprene rubber and (B) a thermoplastic resin, wherein a resin slurry liquid prepared by dispersing the component (B) described above in water is mixed with a latex of the rubber component (A) described above, and then the mixture is coagulated and subjected to drying treatment, a rubber composition containing the resin-extended isoprene rubber obtained by the above process and a pneumatic tire prepared by using the above rubber composition for a member for a tread, and provided are a process for producing a resin-extended isoprene rubber in which a natural rubber and/or a synthetic isoprene rubber and a resin are used and in which the above resin is highly dispersed, a rubber composition which contains the resin-extended isoprene rubber obtained by the above process and which can secure a fracture characteristic and the like and a pneumatic tire prepared by using the above rubber composition.

15 Claims, No Drawings

(56) References Cited

FOREIGN PATENT DOCUMENTS

| JP | 2008-208265 A | 9/2008 |
|----|---------------|--------|
| JP | 2008-303328 A | 12/2008 |
| WO | 2006/054713 A1 | 5/2006 |
| WO | 2010/123015 A1 | 10/2010 |

OTHER PUBLICATIONS

Supplementary European Search Report issued on Jan. 2, 2013 from the European Patent Office in corresponding European Application No. 10 76 7072.

* cited by examiner

PROCESS FOR PRODUCING RESIN-EXTENDED ISOPRENE RUBBER, RUBBER COMPOSITION OBTAINED BY THE PROCESS AND PNEUMATIC TIRE

CROSS REFERENCE TO RELATED APPLICATION

This application is a National Stage of International Application No. PCT/JP2010/057031 filed Apr. 21, 2010, claiming priority based on Japanese Patent Application Nos. 2009-103146 and 2009-103150 both filed Apr. 21, 2009, the contents of all of which are incorporated herein by reference in their entirety.

BACKGROUND OF THE INVENTION

The present invention relates to a process for producing a resin-extended isoprene rubber, a rubber composition obtained by the above process and a pneumatic tire prepared by using the above rubber composition. To be more specific, the present invention relates to a process for producing a resin-extended isoprene rubber containing a resin which is highly dispersed, a rubber composition which contains a resin-extended isoprene rubber obtained by the above process and which can secure a fracture characteristic and the like and a pneumatic tire prepared by using the above rubber composition for a tread member.

BACKGROUND ART

Rubber compositions prepared by blending resins with rubber components containing a natural rubber, a synthetic isoprene rubber and/or a styrene-butadiene copolymer rubber (hereinafter referred to as "SBR") have so far been used for the purposes of providing a tuck, enhancing a frictional force (grip performance) of a tire tread and the like, and various matters are proposed therefor (refer to patent documents 1 to 3).

However, the rubber compositions described above have so far been produced usually by kneading (wet method) resins with rubber components containing a natural rubber, a synthetic isoprene rubber and/or SBR by means of a mixer, and therefore the problems that the above resins are insufficiently dispersed and that the fracture characteristic and the like can not sufficiently be secured have been involved therein.

On the other hand, a natural rubber master batch which can enhance a fracture characteristic of a rubber composition is known. Disclosed are, for example, a process for producing a modified natural rubber master batch by a wet method comprising a step for mixing a modified natural rubber with a slurry liquid prepared by dispersing a reinforcing filler in water (refer to a patent document 4) and a process for producing a natural rubber master batch by a wet method comprising a step for mixing a natural rubber latex in which an amide bond is decomposed with a slurry liquid prepared by dispersing a reinforcing filler in water (refer to a patent document 5).

According to the above processes for producing the natural rubber master batches, the reinforcing fillers in the natural rubber master batches obtained have a very good dispersibility, and a reinforcing effect is sufficiently exerted by the above reinforcing fillers.

Patent document 1: Japanese Patent Application Laid-Open No. 208265/2008
Patent document 2: Japanese Patent Application Laid-Open No. 189725/2008
Patent document 4: Japanese Patent Application Laid-Open No. 208888/1996
Patent document 4: WO2006/054713
Patent document 5: Japanese Patent Application Laid-Open No. 99625/2004

DISCLOSURE OF THE INVENTION

As described above, as far as a reinforcing filler is concerned, a process in which an aqueous slurry liquid containing the above reinforcing filler is mixed with a natural rubber latex to produce a natural rubber master batch is known, but the existing situation is that a technique in which an aqueous slurry liquid containing a resin is mixed with a natural rubber and/or a synthetic isoprene rubber latex to produce a resin-extended isoprene rubber allowing the above resin to be highly dispersed therein has not so far been known.

The present invention has been made under the situations described above, and an object of the present invention is to provide a process for producing a resin-extended isoprene rubber in which a natural rubber and/or a synthetic isoprene rubber and a resin are used and in which the above resin is highly dispersed, a rubber composition which contains a resin-extended isoprene rubber obtained by the above process and which can secure a fracture characteristic and the like and a pneumatic tire prepared by using the above rubber composition.

Intensive investigations repeated by the present inventors in order to achieve the object described above have resulted in finding that after mixing a slurry liquid prepared by dispersing a thermoplastic resin in water with a natural rubber and/or a synthetic isoprene rubber latex, the mixture is coagulated and subjected to drying treatment, whereby a resin-extended isoprene rubber in which the thermoplastic resin described above is highly dispersed is readily obtained and that the object thereof can be achieved. The present invention has been completed based on the above knowledges.

That is, the present invention provides a process for producing a resin-extended isoprene rubber comprising (A) a rubber component containing a natural rubber and/or a synthetic isoprene rubber and (B) a thermoplastic resin, wherein a resin slurry liquid prepared by dispersing the component (B) described above in water is mixed with a latex of the rubber component (A) described above, and then the mixture is coagulated and subjected to drying treatment, a rubber composition characterized by containing a resin-extended isoprene rubber obtained by the above production process and a pneumatic tire characterized by using the above rubber composition for a tread member.

According to the present invention, capable of being provided are a process for producing a resin-extended isoprene rubber containing a resin which is highly dispersed therein, a rubber composition which contains a resin-extended isoprene rubber obtained by the above process and which can secure a fracture characteristic and the like and a pneumatic tire prepared by using the above rubber composition for a tread member.

First, the process for producing a resin-extended isoprene rubber according to the present invention shall be explained.
Process for Producing a Resin-Extended Isoprene Rubber:

The process for producing a resin-extended isoprene rubber according to the present invention is a process for producing a resin-extended isoprene rubber comprising (A) a rubber component containing a natural rubber and/or a synthetic isoprene rubber and (B) a thermoplastic resin, wherein a resin slurry liquid prepared by dispersing the component (B) described above in water is mixed with a latex of the rubber component (A) described above, and then the mixture is coagulated and subjected to drying treatment.

Rubber Component (A):

In the resin-extended isoprene rubber obtained by the process of the present invention, a natural rubber and/or a synthetic isoprene rubber are used as the rubber component (A).

The above natural rubber and synthetic isoprene rubber shall not specifically be restricted and can suitably be selected from ones which have so far been publicly known. The synthetic isoprene rubber is preferably rubbers having a weight average molecular weight of $4 \times 10^5$ or more and a cis bond content of 95% or more. The above weight average molecular weight is a value reduced to polystyrene which is measured by a gel permeation chromatographic method (GPC method).

The main point of the present invention resides in that the rubber composition of the present invention containing the resin-extended isoprene rubber obtained by the process of the present invention secures a fracture characteristic and an abrasion resistance, and from the viewpoint of obtaining the rubber composition which can exert other performances, for example, a good low temperature characteristic, a good wet grip performance and a good low heat generating property, a content of the natural rubber and/or the synthetic isoprene rubber in the above rubber component (A) is preferably 50 to 100% by mass, more preferably 70 to 100% by mass, further preferably 90 to 100% by mass and particularly preferably 100% by mass in substance.

In the above rubber component (A), a rubber component which can be used in combination with the natural rubber and/or the synthetic isoprene rubber described above in a proportion of preferably 50 to 0% by mass, more preferably 30 to 0% by mass and further preferably 10 to 0% by mass includes, for example, butadiene rubbers, styrene-butadiene copolymer rubbers, acrylonitrile-butadiene copolymer rubbers, chloroprene rubbers and mixtures thereof. Further, it may be rubbers in which a part thereof is provided with a branched structure by using a multifunctional modifying agent, for example, tin tetrachloride, silicon tetrachloride and the like.

Thermoplastic Resin (B):

In the resin-extended isoprene rubber obtained by the process of the present invention, a thermoplastic resin is used as the component (B). The above thermoplastic resin shall not specifically be restricted, and capable of being used are various resins, for example, C5 based resins, C5 to C9 based resins, terpene based resins, terpene-aromatic compound based resins, C9 based resins, rosin based resins, alkylphenol based resins and the like. Among them, at least one selected from the C5 based resins, the C5 to C9 based resins, the terpene based resins and the terpene-aromatic compound based resins is preferably used.

In this connection, the C5 based resins show C5 base synthetic petroleum resins and are solid polymers obtained by polymerizing C5 fractions by using a Friedel-Crafts catalyst such as $AlCl_3$, $BF_3$ and the like, and they include, for example, copolymers comprising principal components such as isoprene, cyclopentadiene, 1,3-pentadiene, 1-pentene and the like, copolymers of 2-pentene with dicyclopentadiene and polymers comprising principal components such as 1,3-pentadiene.

The C5 to C9 based resins show C5 to C9 base synthetic petroleum resins and are solid polymers obtained by polymerizing C5 to C11 fractions by using a Friedel-Crafts catalyst such as $AlCl_3$, $BF_3$ and the like, and they include, for example, copolymers comprising principal components such as styrene, vinyltoluene, α-methylstyrene, indene and the like.

In the present invention, the above C5 to C9 based resins are preferably resins having less components of C9 or more from the viewpoint of a compatibility with the component (A). In this regard, the term "having less components of C9 or more" means that the components of C9 or more account for less than 50% by mass, preferably 40% by mass or less based on a whole amount of the resins.

The terpene based resins described above are solid resins obtained by blending terebinth oil obtained at the same time as in obtaining rosin from trees of a pine genus or a polymerizable component separated therefrom and polymerizing it by using a Friedel-Crafts type catalyst, and they include β-pinene resins, α-pinene resins and the like.

Also, terpene-phenol resins can be listed as the representative examples of the terpene-aromatic compound based resins. The above terpene-phenol resins can be obtained by a method in which terpenes are polymerized with various phenols by using a Friedel-Crafts type catalyst and in which they are further condensed with formalin. The terpenes of the raw material shall not specifically be restricted and are preferably monoterpene hydrocarbons such as α-pinene, limonene and the like, more preferably terpene hydrocarbons containing α-pinene and particularly preferably α-pinene. In the present invention, the terpene-phenol resins having less proportion of a phenol component are suited. In this regard, the term "having less proportion of a phenol component" means that the phenol component accounts for less than 50% by mass, preferably 40% by mass or less based on a whole amount of the resins.

Further, the C9 based resins show C9 base synthetic petroleum resins and are solid polymers obtained by polymerizing C9 fractions by using a Frieldel-Crafts catalyst such as $AlCl_3$, $BF_3$ and the like, and they include copolymers comprising principal components such as indene, methylindene, α-methylstyrene, vinyltoluene and the like.

On the other hand, the rosin based resins include natural resin rosins such as gum rosin, tall oil resin, wood rosin and the like which are contained in crude colophony and tall oil, and modified rosin, rosin derivatives and modified rosin derivatives include, for example, polymerized rosins and partially hydrogenated rosins thereof; glycerin ester rosins, partially hydrogenated rosins thereof and completely hydrogenated rosins thereof; pentaerythritol ester rosins, partially hydrogenated rosins thereof and polymerized rosins thereof; and the like.

Further, the alkylphenol based resins include, for example, alkylphenol-acetylene resins such as p-tert-butylphenol-acetylene resins, alkylphenol-formaldehyde resins having a low polymerization degree and the like.

In addition to the above resins, coumarone-indene resins, xylene based resins, vinyltoluene-α-methylstyrene copolymers and the like can be used as well.

The above thermoplastic resins are suitably selected according to performances desired to the rubber composition of the present invention containing the resin-extended isoprene rubber obtained by the process of the present invention. For example, when required is the rubber composition which secures a fracture characteristic and an abrasion resistance and which can exert a good low temperature characteristic, a good wet grip performance and a good low heat generating property, a haze value of the above thermoplastic resin is preferably 34% or less, more preferably 30% or less and further preferably 20% or less, which is measured by the following method and which shows a compatibility with the component (A) described above. The lower the above haze value is, the better the transparency is, and the more excellent the compatibility with the component (A) is.

<Measuring Method of Haze Value>

A solution prepared by dissolving 3 g of a synthetic isoprene rubber and 1.125 g of the thermoplastic resin of the sample in 50 mL of tetrahydrofuran at a temperature of 25° C. is subjected to cast molding to obtain a film having a thickness of 600 μm, and a haze value thereof is measured based on JIS K 6714. The details of the method for measuring a haze value shall be explained later.

The thermoplastic resin having a haze value of preferably 34% or less which is measured by the method described above includes, for example, C5 based resins, C5 to C9 based resins having less component of C9 or more, terpene based resins, terpene-phenol resins having less proportion of a phenol component and the like.

In the present invention, the thermoplastic resin of the above component (B) may be used alone or in combination of two or more kinds thereof. Also, a content of the above thermoplastic resin in the resin-extended isoprene rubber obtained is preferably 8 to 100 parts by mass, more preferably 10 to 50 parts by mass, further preferably 15 to 50 parts by mass and particularly preferably 20 to 50 parts by mass based on 100 parts by mass of the rubber component (A) in order to make it possible to secure a fracture characteristic and an abrasion resistance desired to the rubber composition of the present invention containing the resin-extended isoprene rubber obtained by the process of the present invention.

Preparation of Resin-Extended Isoprene Rubber:

In the present invention, a resin slurry liquid prepared by dispersing the thermoplastic resin of the component (B) described above in water is mixed with the latex of the rubber component (A) described above, and then the mixture is coagulated and subjected to drying treatment, whereby the resin-extended isoprene rubber can be prepared.

<Resin Slurry Liquid>

In the present invention, the resin slurry liquid obtained by dispersing the thermoplastic resin of the component (B) in water can be prepared by a method which has so far been publicly known, and mixing devices such as, for example, a high shear mixer of a rotor•stator type, a high pressure homogenizer, a supersonic homogenizer, a colloid mill and the like can be used. To be specific, water is put in a colloid mill, and the above resin is slowly dropwise added thereto while stirring. Then, the solution is circulated together with a surfactant used if necessary at a fixed pressure and a fixed temperature by means of a homogenizer, whereby the resin slurry liquid can be prepared. In the above case, the pressure falls in a range of usually 10 to 1000 kPa, preferably 200 to 800 kPa. Also, the particles of the above resin are mixed with water in a fixed proportion, and a mixed liquid thereof is introduced into one end of an elongated conduit, whereby a continuous flow of the slurry having a homogeneous composition can be formed on a condition of heavy hydraulic stirring. A concentration of the above resin in the slurry liquid described above falls in a range of preferably 0.5 to 60% by mass, more preferably 1 to 30% by mass.

A volume average particle diameter of the resin particles in the slurry liquid is preferably 25 μm or less, more preferably 20 μm or less from the viewpoint of a dispersibility thereof in the resin-extended isoprene rubber obtained. The volume average particle diameter described above is a value measured by means of a laser diffraction type particle size distribution meter.

Further, the surfactant used if necessary includes anionic, cationic, nonionic and amphoteric surfactants, and among them, the anionic and nonionic surfactants are preferred.

<Latex of the Component (A)>

The latex of the component (A) used in the present invention is a mixture of a natural rubber latex and/or a synthetic isoprene rubber latex with a latex of at least one synthetic rubber selected from butadiene rubbers, styrene-butadiene copolymer rubbers, acrylonitrile-butadiene copolymer rubbers and chloroprene rubbers used if desired.

Capable of being used as the natural rubber latex is any of field latices, ammonia-treated latices, centrifugally separated and condensed latices, deproteinized latices treated with an enzyme and combinations of the latices described above.

The latex of the component (A) can contain, if necessary, a surfactant. The above surfactant includes anionic, cationic, nonionic and amphoteric surfactants, and among them, the anionic and nonionic surfactants are preferred.

The resin slurry liquid described above is mixed with the latex of the component (A), for example, by a method in which the above resin slurry liquid is put in a homomixer and in which the latex is dropwise added thereto while stirring and a method in which contrary to the above, the resin slurry liquid is dropwise added to the latex while stirring it. Further, a method in which a resin slurry flow and a latex flow each having a constant flow amount proportion are mixed under a heavy hydraulic stirring condition can be used as well.

Next, the rubber component latex (A) containing the resin slurry thus obtained is subjected to coagulation treatment to form a coagulated substance. The above coagulating method is carried out by using a conventionally known method, for example, by using a coagulating agent including acids such as formic acid, sulfuric acid and the like and salts such as sodium chloride and the like.

The coagulated substance formed by the above coagulation treatment is taken out by using conventionally known solid-liquid separating means and sufficiently washed. A water washing method is used usually for washing.

Next, the coagulated substance subjected to washing treatment is subjected to drying treatment. A drying treating method thereof shall not specifically be restricted, and the above coagulated substance can be subjected to drying treatment by means of various equipments.

A method for carrying out drying treatment by means of a drying equipment such as a hot blast dryer, a vacuum dryer, a freeze dryer and the like can be preferably employed.

Further, a method in which dehydration and drying treatment is carried out while applying a mechanical shearing force is a preferred method as well. In this case, a continuous kneading equipment or a continuous multiaxial kneading equipment is preferably used from the industrial productivity. Further, a continuous multiaxial kneading extruding equipment having equivalent direction rotation or different direction rotation is preferably used, and a continuous biaxial kneading extruding equipment is particularly preferably used.

Thus, the resin-extended isoprene rubber in which the thermoplastic resin of the component (B) is highly dispersed is obtained. A dispersibility of the resin in the resin-extended isoprene rubber can be evaluated by determining Disp-X according to a method shown below. It is shown that the larger the value of Disp-X is, the more excellent the dispersibility is. The above Disp-X is usually about 4 to 10, preferably 6 to 10.

<Measurement of Disp-X>

The vulcanized rubber is cut by means of an exclusive cutter for preparing a test piece, and the dispersion states of the four test surfaces are measured respectively by means of "DISPERGRADER MODEL 1000" manufactured by TECH PRO Inc. It is rated to 1 to 10 ranks and evaluated by comparing with a reference image.

Next, the rubber composition of the present invention shall be explained.

Rubber Composition:

The rubber composition of the present invention is characterized by containing the resin-extended isoprene rubber produced by the process of the present invention described above.

In the rubber composition of the present invention, a reinforcing filler can be further contained as a component (C).

Reinforcing Filler (C):

Carbon black and/or silica are preferably used as the reinforcing filler.

The carbon black described above shall not specifically be restricted, and optional ones suitably selected from carbon blacks which have so far been used as reinforcing fillers for rubbers can be used. For example, SRF, GPF, FEF, HAF, ISAF, SAF and the like are used, and HAF, ISAF and SAF which are excellent in an abrasion resistance are particularly preferred.

The above carbon blacks may be used alone or in combination of two or more kinds thereof.

On the other hand, silica includes, for example, wet silica (hydrous silicic acid), dry silica (anhydrous silicic acid), calcium silicate, aluminum silicate and the like, and among them, wet silica is preferred.

A BET specific surface area of the above wet silica is preferably 40 to 350 $m^2/g$. Silica in which a BET specific surface area falls in the above range has the advantage that a rubber reinforcing property is compatible with a dispersibility into the rubber component. From the above viewpoint, silica in which a BET specific surface area falls in a range of 80 to 300 $m^2/g$ is further preferred. Commercial products such as trade names "Nipsil AQ" and "Nipsil KQ" manufactured by Tosoh Silica Corporation and a trade name "Ultrasil VN3" manufactured by Degussa AG. can be used as the above silica.

The above silicas may be used alone or in combination of two or more kinds thereof.

In the rubber composition of the present invention, a content of the reinforcing filler, preferably the carbon black and/or silica described above is preferably 20 to 120 parts by mass, more preferably 35 to 100 parts by mass based on 100 parts by mass of the rubber component (A) described above. If the above content is 20 parts by mass or more, the reinforcing effect is exerted, and on the other hand, if it is 120 parts by mass or less, the rolling resistance is prevented from being too large.

Silane Coupling Agent:

In the rubber composition of the present invention, when silica is used as the reinforcing filler, a silane coupling agent can be blended for the purpose of further enhancing a reinforcing property and a low temperature generating property thereof.

The above silane coupling agent includes, for example, bis(3-triethoxysilylpropyl) tetrasulfide, bis(3-triethoxysilylpropyl) trisulfide, bis(3-triethoxysilylpropyl) disulfide, bis(2-triethoxysilylpropyl) tetrasulfide, bis(3-trimethoxysilylpropyl) trisulfide, bis(2-trimethoxysilylethyl) tetrasulfide, 3-mercaptopropyltrimethoxysilane, 3-mercaptopropyltriethoxysilane, 2-mercaptoethyltrimethoxysilane, 2-mercaptoethyltriethoxysilane, 3-trimethoxysilylpropyl-N,N-dimethylthiocarbamoyl tetrasulfide, 3-triethoxysilylpropyl-N,N-dimethylthiocarbamoyl tetrasulfide, 2-triethoxysilylethyl-N,N-dimethylthiocarbamoyl tetrasulfide, 3-trimethoxysilylpropylbenzothiazolyl tetrasulfide, 3-triethoxysilylpropylbenzothiazolyl tetrasulfide, 3-triethoxysilylpropylmethacrylate monosulfide, 3-trimethoxysilylpropylmethacrylate monosulfide, bis(3-diethoxymethylsilylpropyl) tetrasulfide, 3-mercaptopropyldimethoxymethylsilane, dimethoxymethylsilylpropyl-N,N-dimethylthiocarbamoyl tetrasulfide, dimethoxymethylsilylpropylbenzothiazolyl tetrasulfide and the like. Among them, bis(3-triethoxysilylpropyl) polysulfide and 3-trimethoxysilylpropylbenzothiazolyl tetrasulfide are suited from the viewpoint of a reinforcing property-improving effect.

The above silane coupling agents may be used alone or in combination of two or more kinds thereof.

In the rubber composition of the present invention, a content of the preferred silane coupling agent is varied according to the kind of the silane coupling agent, and it is selected in a range of preferably 2 to 25% by mass based on silica. If the above amount is less than 2% by mass, the effect is less liable to be sufficiently exerted, and it exceeds 25% by mass, gelation of the rubber component is likely to be brought about. A blend amount of the above silane coupling agent falls in a range of more preferably 2 to 20% by mass, further preferably 5 to 18% by mass and particularly preferably 5 to 15% by mass.

Action:

In the present invention, the resin slurry liquid and a latex of a natural rubber and/or a synthetic isoprene rubber are subjected to liquid-liquid mixing, whereby obtained is the resin-extended isoprene rubber in which the resin described above is dispersed highly in the natural rubber and/or the synthetic isoprene rubber. Accordingly, in the rubber composition containing the above resin-extended isoprene rubber, the resin is decreased in a coagulated lump which can be a fracture nucleus, whereby the above rubber composition is enhanced in a fracture characteristic and an abrasion resistance.

Preparation of Rubber Composition:

Various chemicals usually used in the rubber industry, for example, vulcanizing agents, vulcanization accelerating agents, antioxidants, scorch preventives, zinc oxide, stearic acid and the like can be added, if desired, to the rubber composition of the present invention as far as the object of the present invention is not damaged.

The vulcanizing agents described above include sulfur and the like, and a used amount thereof is preferably 0.1 to 10.0 parts by mass, more preferably 1.0 to 5.0 parts by mass in terms of a sulfur content based on 100 parts by mass of the rubber component. If it is less than 0.1 part by mass, the vulcanized rubber is likely to be reduced in a rupture strength, an abrasion resistance and a low temperature heat generating property, and if it exceeds 10.0 parts by mass, it causes the rubber elasticity to be lost.

The vulcanization accelerating agent which can be used in the rubber composition of the present invention shall not specifically be restricted and includes, for example, vulcanization accelerating agents of a thiazole base such as M (2-mercaptobenzothiazole), DM (dibenzothiazyl disulfide), CZ (N-cyclohexyl-2-benzothiazylsulfenamide) and the like and a guanidine base such as DPG (diphenylguanidine) and the like, and a used amount thereof is preferably 0.1 to 5.0 parts by mass, more preferably 0.2 to 3.0 parts by mass based on 100 parts by mass of the rubber component.

Further, the antioxidant which can be used in the rubber composition of the present invention includes, for example, 3C (N-isopropyl-N'-phenyl-p-phenylenediamine), 6C[N-(1,3-dimethylbutyl)-N'-phenyl-p-phenylenediamine], AW (6-ethoxy-2,2,4-trimethyl-1,2-dihydroxyquinoline) and high temperature condensation products of diphenylamine and acetone. A used amount thereof is preferably 0.1 to 6.0 parts by mass, more preferably 0.3 to 5.0 parts by mass based on 100 parts by mass of the rubber component (rubber matrix).

The rubber composition of the present invention can be prepared by kneading the respective components described above by means of a kneading equipment such as a Banbury mixer, a roll, an international mixer and the like.

The rubber composition of the present invention thus prepared is provided with a good rupture strength and a good abrasion resistance and suitably used particularly as a member for a tread of a pneumatic tire.

Pneumatic Tire:

The pneumatic tire of the present invention is characterized by using the rubber composition of the present invention described above for a member for a tread.

The pneumatic tire of the present invention is produced by a conventional method. That is, the rubber composition containing, if necessary, various chemicals as described above is molded and processed into a member for a tread in a non-vulcanized stage, and the member for a tread is stuck for molding by a conventional method on a tire molding machine, whereby a crude tire is molded. The above crude tire is heated and pressurized in a vulcanizing equipment, whereby a tire is obtained.

Usual air or air in which an oxygen partial pressure is changed or inert gas such as nitrogen and the like is used as gas filled into the tire.

The pneumatic tire of the present invention is suitably used particularly as a radial tire for passenger cars.

EXAMPLES

Next, the present invention shall be explained in further details with reference to examples, but the present invention shall by no means be restricted by the examples shown below.

Various measurements and evaluations were carried out by the following methods.

(1) Measurement of a Haze Value Showing a Compatibility of the Component (B) with the Component (A):

A solution prepared by dissolving 3 g of a synthetic isoprene rubber (trade name "JSR IR2200", manufactured by JSR Corporation) and 1.125 g of the thermoplastic resin of the sample in 50 mL of tetrahydrofuran was subjected to cast molding and then to hot pressing on the conditions of 100° C. and 20 MPa to obtain a film having a thickness of 600 µm, and a haze value thereof was measured based on JIS K 6714 by means of "TRIBIDIMETER NDH5000W" manufactured by Nippon Denshoku Industries Co., Ltd.

(2) Dispersibility of the Resin in the Resin-Extended Isoprene Rubber:

Disp-X was determined according to the method described in the present specification to evaluate a dispersibility of the resin.

(3) Evaluation of Rubber Composition:

<Tensile Strength (Tb) of Vulcanized Rubber>

Vulcanized rubbers obtained by vulcanizing the respective rubber compositions at 145° C. for 33 minutes were subjected to a tensile test according to JIS K 6301-1995 to measure a tensile strength (Tb). It is shown that the larger the tensile strength is, the better the rupture resistance is.

<Abrasion Resistance of Vulcanized Rubber>

Vulcanized rubbers obtained by vulcanizing the respective rubber compositions at 145° C. for 33 minutes were used to measure an abrasion amount at a slip rate of 60% at room temperature by means of a Lambourn type abrasion test equipment, and it was shown by an index, wherein an inverse number of an abrasion amount in Comparative Example 1 was set to 100. It is shown that the larger the index value is, the less the mass is reduced and that the more excellent the abrasion resistance is.

Examples 1 to 10

Crushed substances (crushed in a mortar) of thermoplastic resins (A to D) having properties shown in Table 1 which were used in amounts shown in Table 1 were put in water and subjected to slurrying treatment at a rate of 4800 rounds/minute for 30 minutes by means of a high shear mixer manufactured by Silverson Machines, Inc. to prepare resin slurry liquids having a concentration of 5% by mass. Volume average particle diameters of the resin particles measured by means of a laser diffraction type particle size distribution meter are shown in Table 1.

Next, a whole amount of the above resin slurry liquid was mixed with 3636 g of a natural rubber field latex containing ammonia diluted to 20% by mass while stirring, and then the mixture was coagulated by adding formic acid thereto to control it to pH 4.7. The above solid substance was turned into crumbs by allowing it to pass through a craper five times and a shredder and then dried at 110° C. for 210 minutes by means of a hot ballast dryer, whereby obtained were the respective resin-extended natural rubbers containing about 37.5 parts by mass of the resin per 100 parts by mass of the natural rubber. The analytical results thereof are shown in Table 1. A content of the resin is a value based on 100 parts by mass of the natural rubber which was analyzed by extraction with acetone. Further, Disp-X of the respective resin-extended natural rubbers was measured to evaluate a dispersibility of the resins. The results thereof are shown in Table 3.

TABLE 1

| | | Kind of resin Structure | Softening point (° C.) | Haze value (%) | Used amount of resin (g) | Used amount of field latex (g) | Resin content of resin-extended natural rubber (mass part[1]) | Average particle diameter of resin particles in resin slurry liquid (µm) |
|---|---|---|---|---|---|---|---|---|
| Example 1 | A | C5 based resin | 100 | 31 | 273 | 3636 | 37.0 | 15 |
| Example 2 | B | C5 to C9 based resin | 102 | 30 | 273 | 3636 | 37.8 | 13 |
| Example 3 | C | Terpene-phenol resin | 100 | 20 | 273 | 3636 | 37.5 | 10 |
| Example 4 | D | C9 based resin | 145 | 98 | 273 | 3636 | 37.2 | 14 |
| Example 5 | C | Terpene-phenol resin | 100 | 20 | 146 | 3636 | 20.1 | 11 |
| Example 6 | C | Terpene-phenol resin | 100 | 20 | 218 | 3636 | 30.3 | 11 |
| Example 7 | C | Terpene-phenol resin | 100 | 20 | 371 | 3636 | 50.8 | 10 |
| Example 8 | C | Terpene-phenol resin | 100 | 20 | 36 | 3636 | 5.0 | 10 |

TABLE 1-continued

|  |  | Kind of resin Structure | Softening point (° C.) | Haze value (%) | Used amount of resin (g) | Used amount of field latex (g) | Resin content of resin-extended natural rubber (mass part[1]) | Average particle diameter of resin particles in resin slurry liquid (μm) |
|---|---|---|---|---|---|---|---|---|
| Example 9 | C | Terpene-phenol resin | 100 | 20 | 109 | 3636 | 15.0 | 10 |
| Example 10 | C | Terpene-phenol resin | 100 | 20 | 582 | 3636 | 80.0 | 10 |

Remark:
[1]mass part is a value based on 100 mass parts of the natural rubber

Remarks:
C5 based resin: trade name "ECR1102" manufactured by ExxonMobil Chemical Company
C5 to C9 based resin: trade name "ECR213" manufactured by ExxonMobil Chemical Company
Terpene-phenol resin: trade name "YS Polystar T100" manufactured by Yasuhara Chemical Co., Ltd.
C9 based resin: trade name "Neopolymer 140" manufactured by Nippon Petrochemicals Co., Ltd.

Examples 11 to 20

The respective rubber compositions were prepared based on the respective blend contents shown in Table 3. The blend compositions of the respective components are shown in Table 2.

The respective rubber compositions were vulcanized by a conventional method to prepare samples for the respective tests, and a tensile strength (Tb) and an abrasion resistance of the respective samples were measured. The results thereof are shown in Table 3.

Comparative Examples 1 to 7

The respective rubber compositions were prepared in the same manners as in Examples 11 to 20, except that in Examples 11 to 20, a natural rubber and a thermoplastic resin which were used in blend proportions shown in Table 4 and which were pre-blended by means of a Banbury mixer were used in place of the resin-extended natural rubbers. Disp-X of the pre-blended substances was measured to evaluate a dispersibility of the resins. The results thereof are shown in Table 4. Further, vulcanized samples for the respective tests were prepared to measure a tensile strength (Tb) and an abrasion resistance of the respective samples. The results thereof are shown in Table 4.

TABLE 2

|  | Example | Comparative Example |
|---|---|---|
| Resin-extended natural rubber[1] | varied | — |
| Natural rubber[2] | — | 100 |
| Resin[3] | — | varied |
| Carbon black N339[4] | 50 | 50 |
| Stearic acid | 2 | 2 |
| Antioxidant 6C[5] | 1 | 1 |
| Zinc oxide | 3 | 3 |
| Vulcanization accelerating agent[6] | 0.8 | 0.8 |
| Sulfur | 1 | 1 |

Remarks:
[1]Resin-extended natural rubber: prepared in Examples 1 to 10
[2]Natural rubber: grade name "SIR20" made in Indonesia
[3]Resin: resins described in Table 1
[4]Carbon black N339: trade name "Seast KH" manufactured by Tokai Carbon Co., Ltd.
[5]Antioxidant 6C: trade name "Nocrac 6C", N-(1,3-dimethylbutyl)-N'-phenyl-p-phenylnediamine, manufactured by Ouchi Shinko Chemical Industrial Co., Ltd.
[6]Vulcanization accelerating agent: trade name "Nocceler CZ",N-cyclohexyl-2-benzothiazylsulfenamide, manufactured by Ouchi Shinko Chemical Industrial Co., Ltd.

TABLE 3

|  |  |  | Example | | | | | | | | | |
|---|---|---|---|---|---|---|---|---|---|---|---|---|
|  |  |  | 11 | 12 | 13 | 14 | 15 | 16 | 17 | 18 | 19 | 20 |
| Rubber composition | Resin-extended natural rubber | Example No. | 1 | 2 | 3 | 4 | 5 | 6 | 7 | 8 | 9 | 10 |
|  |  | (mass part) | 137.0 | 137.8 | 137.5 | 137.2 | 120.1 | 130.3 | 150.8 | 105.0 | 115.0 | 180.0 |
|  |  | Resin kind | A | B | C | D | C | C | C | C | C | C |
| Resin dispersibility in resin-extended natural rubbers [Disp-X] |  |  | 6.8 | 6.5 | 7.0 | 6.6 | 6.7 | 7.2 | 7.1 | 7.2 | 7.1 | 6.8 |
| Evaluation | Tensile strength Tb (MPa) |  | 23.5 | 24.0 | 24.5 | 24.4 | 27.0 | 26.3 | 21.0 | 21.0 | 27.1 | 21.2 |
|  | Abrasion resistance (index) |  | 150 | 138 | 140 | 125 | 145 | 143 | 138 | 128 | 135 | 142 |

Remark: in the mass parts of the resin-extended natural rubbers, the natural rubber accounts for 100 mass parts, and the resin accounts for the remainder.

TABLE 4

|  |  | Comparative Example | | | | | | |
|---|---|---|---|---|---|---|---|---|
|  |  | 1 | 2 | 3 | 4 | 5 | 6 | 7 |
| Rubber composition | Natural rubber (mass part) | 100 | 100 | 100 | 100 | 100 | 100 | 100 |
|  | Resin (mass part) | 37.5 | 37.5 | 37.5 | 37.5 | 20 | 30 | 51 |
|  | Kind | A | B | C | D | C | C | C |
| Resin dispersibility in pre-blended substance [Disp-X] | | 2.0 | 2.8 | 3.0 | 4.0 | 3.2 | 3.1 | 2.9 |
| Evaluation | Tensile strength Tb (MPa) | 16.2 | 18.1 | 17.5 | 21.0 | 22.0 | 20.2 | 15.5 |
|  | Abrasion resistance (index) | 100 | 100 | 100 | 100 | 100 | 100 | 100 |

Remark: the natural rubber and the resin were used after pre-blended by means of a Banbury mixer.

INDUSTRIAL APPLICABILITY

The process of the present invention for producing a resin-extended isoprene rubber can provide a resin-extended isoprene rubber containing a resin which is highly dispersed, and the rubber composition of the present invention containing the above resin-extended isoprene rubber has a good fracture characteristic and a good abrasion resistance and is suitably used as a member for a tread of a pneumatic tire.

What is claimed is:

1. A process for producing a resin-extended isoprene rubber comprising (A) a rubber component containing a natural rubber and/or a synthetic isoprene rubber and (B) a thermoplastic resin, wherein a resin slurry liquid prepared by dispersing the component (B) in water is mixed with a latex of the rubber component (A), and then the mixture is coagulated and subjected to drying treatment,
wherein the thermoplastic resin of the component (B) is at least one selected from C5 based resins, C5 to C9 based resins, terpene based resins and terpene-aromatic compound based resins, and
wherein the thermoplastic resin of the component (B) has a haze value of 34% or less which is measured by the following method and which shows a compatibility with the component (A):
<Measuring method of haze value>
A solution prepared by dissolving 3 g of a synthetic isoprene rubber and 1.125 g of the thermoplastic resin of the sample in 50 mL of tetrahydrofuran at a temperature of 25° C. is subjected to cast molding to obtain a film having a thickness of 600 μm, and a haze value thereof is measured based on JIS K 6714.

2. The process for producing a resin-extended isoprene rubber according to claim 1, wherein the resin-extended isoprene rubber contains the component (B) in a proportion of 8 to 100 parts by mass based on 100 parts by mass of the rubber component (A).

3. The process for producing a resin-extended isoprene rubber according to claim 1, wherein the rubber component (A) contains 50 to 100% by mass of a natural rubber and/or a synthetic isoprene rubber.

4. The process for producing a resin-extended isoprene rubber according to claim 1, wherein the thermoplastic resin of the component (B) has a haze value of 30% or less which shows a compatibility with the component (A).

5. The process for producing a resin-extended isoprene rubber according to claim 3, wherein the rubber component (A) contains 70 to 100% by mass of the natural rubber and/or the synthetic isoprene rubber.

6. The process for producing a resin-extended isoprene rubber according to claim 2, wherein the resin-extended isoprene rubber contains the component (B) in a proportion of 10 to 50 parts by mass based on 100 parts by mass of the rubber component (A).

7. A rubber composition containing the resin-extended isoprene rubber produced by the process according to claim 1.

8. The rubber composition according to claim 7, further containing a reinforcing filler (C).

9. The rubber composition according to claim 8, wherein the reinforcing filler (C) is carbon black and/or silica, and a content thereof is 20 to 120 parts by mass based on 100 parts by mass of the component (A).

10. A pneumatic tire characterized by using the rubber composition according to claim 7 for a member for a tread.

11. The pneumatic tire according to claim 10, wherein the pneumatic tire is a radial tire for passenger cars.

12. The process for producing a resin-extended isoprene rubber according to claim 1, wherein the thermoplastic resin of the component (B) is a terpene based resin.

13. The process for producing a resin-extended isoprene rubber according to claim 1, wherein the thermoplastic resin of the component (B) is a terpene-aromatic compound based resin.

14. The process for producing a resin-extended isoprene rubber according to claim 12, wherein the terpene based resin is an α-pinene resin or a β-pinene resin.

15. The process for producing a resin-extended isoprene rubber according to claim 13, wherein the terpene-aromatic compound based resin is a terpene-phenol resin.

* * * * *